United States Patent
Ajisaka

(10) Patent No.: US 11,679,695 B2
(45) Date of Patent: Jun. 20, 2023

(54) VEHICLE SEAT

(71) Applicant: TOYOTA JIDOSHA KABUSHIKI KAISHA, Aichi-ken (JP)

(72) Inventor: Satoshi Ajisaka, Okazaki (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 331 days.

(21) Appl. No.: 17/183,359

(22) Filed: Feb. 24, 2021

(65) Prior Publication Data

US 2021/0276460 A1 Sep. 9, 2021

(30) Foreign Application Priority Data

Mar. 3, 2020 (JP) .............................. JP2020-036121

(51) Int. Cl.
  *B60N 2/14* (2006.01)
  *B60N 2/70* (2006.01)
  *B60N 2/02* (2006.01)

(52) U.S. Cl.
  CPC ............. *B60N 2/14* (2013.01); *B60N 2/7047* (2013.01); *B60N 2002/022* (2013.01)

(58) Field of Classification Search
  CPC ............................ B60N 2/14; B60N 2002/022
  USPC .................................................... 296/65.07
  See application file for complete search history.

(56) References Cited

U.S. PATENT DOCUMENTS

| | | | | |
|---|---|---|---|---|
| 4,802,706 A | * | 2/1989 | Onimaru | B60N 2/0224 108/140 |
| 5,474,353 A | * | 12/1995 | Koester | B60N 2/062 297/344.21 |
| 2007/0222251 A1 | * | 9/2007 | Abraham | B60N 2/3047 297/344.21 |
| 2018/0290566 A1 | * | 10/2018 | Sera | B60N 2/242 |
| 2018/0339628 A1 | * | 11/2018 | Kimura | B60N 2/686 |
| 2018/0339629 A1 | * | 11/2018 | Kimura | B60N 2/686 |
| 2019/0077283 A1 | * | 3/2019 | Kimura | B60N 2/995 |
| 2021/0402904 A1 | * | 12/2021 | Sera | B60N 2/995 |
| 2022/0266725 A1 | * | 8/2022 | Hu | B60N 2/0232 |

FOREIGN PATENT DOCUMENTS

| | | | | |
|---|---|---|---|---|
| EP | 358285 A | * | 3/1990 | ............... B60N 2/12 |
| FR | 573167 A | * | 6/1924 | |
| FR | 2495451 A | * | 6/1982 | ............... A61G 3/06 |
| JP | 200799185 A | | 4/2007 | |

(Continued)

*Primary Examiner* — Hilary L Gutman
(74) *Attorney, Agent, or Firm* — Hauptman Ham, LLP

(57) ABSTRACT

A vehicle seat includes: a seat cushion having a seat cushion body and a seat cushion front portion, the seat cushion front portion being provided in front of the seat cushion body and configured to be in contact with and distanced from the seat cushion body, and the seat cushion being configured to be rotated so as to be set to a traveling position facing a front of a vehicle and an ingress and egress position facing a side door; and an expansion and contraction mechanism configured such that the seat cushion front portion is brought into contact with the seat cushion body as the seat cushion rotates from the traveling position to the ingress and egress position, and the seat cushion front portion is distanced away from the seat cushion body as the seat cushion rotates from the ingress and egress position to the traveling position.

8 Claims, 3 Drawing Sheets

(56) References Cited

FOREIGN PATENT DOCUMENTS

| | | | | |
|---|---|---|---|---|
| JP | 2015150960 A | | 8/2015 | |
| JP | 2018131065 A | * | 8/2018 | |
| JP | 2018131065 A | | 8/2018 | |
| WO | WO-02092383 A1 | * | 11/2002 | ............... B60N 2/06 |
| WO | WO-2015184267 A1 | * | 12/2015 | ............... B60N 2/06 |

* cited by examiner

# VEHICLE SEAT

CROSS-REFERENCE TO RELATED APPLICATION

This application claims priority to Japanese Patent Application No. 2020-036121 filed on Mar. 3, 2020, incorporated herein by reference in its entirety.

BACKGROUND

1. Technical Field

The present disclosure relates to a vehicle seat.

2. Description of Related Art

There is known a rotatable vehicle seat (hereinafter sometimes simply referred to as a "seat") that can be set to a traveling position facing the front of a vehicle and an ingress and egress position facing a front side door (see, for example, Japanese Unexamined Patent Application Publication No. 2015-150960 (JP 2015-150960 A)).

SUMMARY

However, the seat is configured such that unless the seat is rotated with the front side door open, the front end of the seat cushion contacts (interferes with) the front side door and the seat cannot be rotated. That is, the front side door cannot be closed after the occupant has gotten off the vehicle unless the seat is rotated to the traveling position facing the front of the vehicle.

Therefore, when the occupant opens the front side door to get on the vehicle, the seat is in the traveling position facing the front of the vehicle, so that the occupant has to wait until the seat finishes rotating from the traveling position to the ingress and egress position facing the front side door.

In view of this, if the length of the seat cushion is reduced, the legs (thighs) of the occupant are not properly supported during traveling, which causes fatigue. As described above, there is still room for improvement in the structure for improving the convenience of the seat when the occupant gets on and off the vehicle without impairing the leg support performance during traveling.

The present disclosure provides a rotatable vehicle seat that can improve convenience when an occupant gets on and off the vehicle without impairing leg support performance during traveling.

A vehicle seat of an aspect of the present disclosure includes: a seat cushion having a seat cushion body and a seat cushion front portion, the seat cushion front portion being provided in front of the seat cushion body and configured to be in contact with and distanced from the seat cushion body, and the seat cushion being configured to be rotated so as to be set to a traveling position facing a front of a vehicle and an ingress and egress position facing a side door; and an expansion and contraction mechanism configured such that the seat cushion front portion is brought into contact with the seat cushion body as the seat cushion rotates from the traveling position to the ingress and egress position, and the seat cushion front portion is distanced away from the seat cushion body as the seat cushion rotates from the ingress and egress position to the traveling position.

According to the above aspect, with the expansion and contraction mechanism, the seat cushion front portion is brought into contact with the seat cushion body as the seat cushion rotates from the traveling position to the ingress and egress position, and the seat cushion front portion is distanced away from the seat cushion body as the seat cushion rotates from the ingress and egress position to the traveling position. That is, the seat cushion is contracted in the ingress and egress position and the seat cushion is expanded in the traveling position.

Therefore, after the occupant gets off the vehicle, the side door can be closed even when the seat cushion is in the ingress and egress position, and when the occupant gets on the vehicle, the seat cushion is in the ingress and egress position so that the occupant can get on the vehicle quickly. In the traveling position, the legs (thighs) of the occupant are appropriately supported by the expanded seat cushion. In this way, according to the present disclosure, the convenience when getting on and off is improved without impairing the leg support performance of the seat cushion during traveling.

In the above aspect, the expansion and contraction mechanism may be a cam mechanism.

According to the above configuration, the structure is simplified and the manufacturing cost is reduced as compared with the case where the expansion and contraction mechanism is an electric mechanism.

In the above aspect, the expansion and contraction mechanism may include: a cam portion provided in a support member that is non-rotatable and supports the seat cushion such that the seat cushion is rotatable with respect to the support member; a receiving surface portion provided in the seat cushion front portion and with which the cam portion is brought into contact; and an urging member that urges the seat cushion front portion toward the seat cushion body.

According to the above configuration, the receiving surface portion of the seat cushion front portion urged by the urging member slides along the cam portion as the seat cushion rotates. Thus, the seat cushion front portion can be accurately moved in the direction of contacting the seat cushion body and in the direction away from the seat cushion body.

In the above aspect, the expansion and contraction mechanism may further include a support rod joined to the receiving surface portion and to which the urging member is connected.

In the above aspect, the urging member may be composed of a coil spring.

According to the above configuration, the cam mechanism has superior reliability and can be manufactured at a lower cost as compared with the case where the urging member is composed of, for example, a leaf spring.

In the above aspect, a first end of the coil spring may be attached to the support rod, and a second end of the coil spring may be attached to the seat cushion body.

In the above aspect, the receiving surface portion may be composed of an iron plate.

According to the above configuration, the receiving surface portion has superior durability and can be manufactured at a lower cost as compared with the case where the receiving surface portion is composed of, for example, a resin flat plate member.

According to the above aspect of the present disclosure, a rotatable vehicle seat can improve convenience when getting on and off without impairing leg support performance during traveling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment according to the present disclosure will be described in detail with reference to the drawings. For convenience of description, the arrow UP, the arrow FR, and the arrow RH appropriately shown in the figures indicate the upward direction of the vehicle seat, the front direction of the vehicle seat, and the right direction of the vehicle seat, respectively. Thus, when terms indicating directions i.e., upward and downward, forward and rearward, and right and left are used in the following description without any specification, these mean upward and downward of the vehicle seat, forward and rearward of the vehicle seat, and right and left of the vehicle seat.

Figure 1:
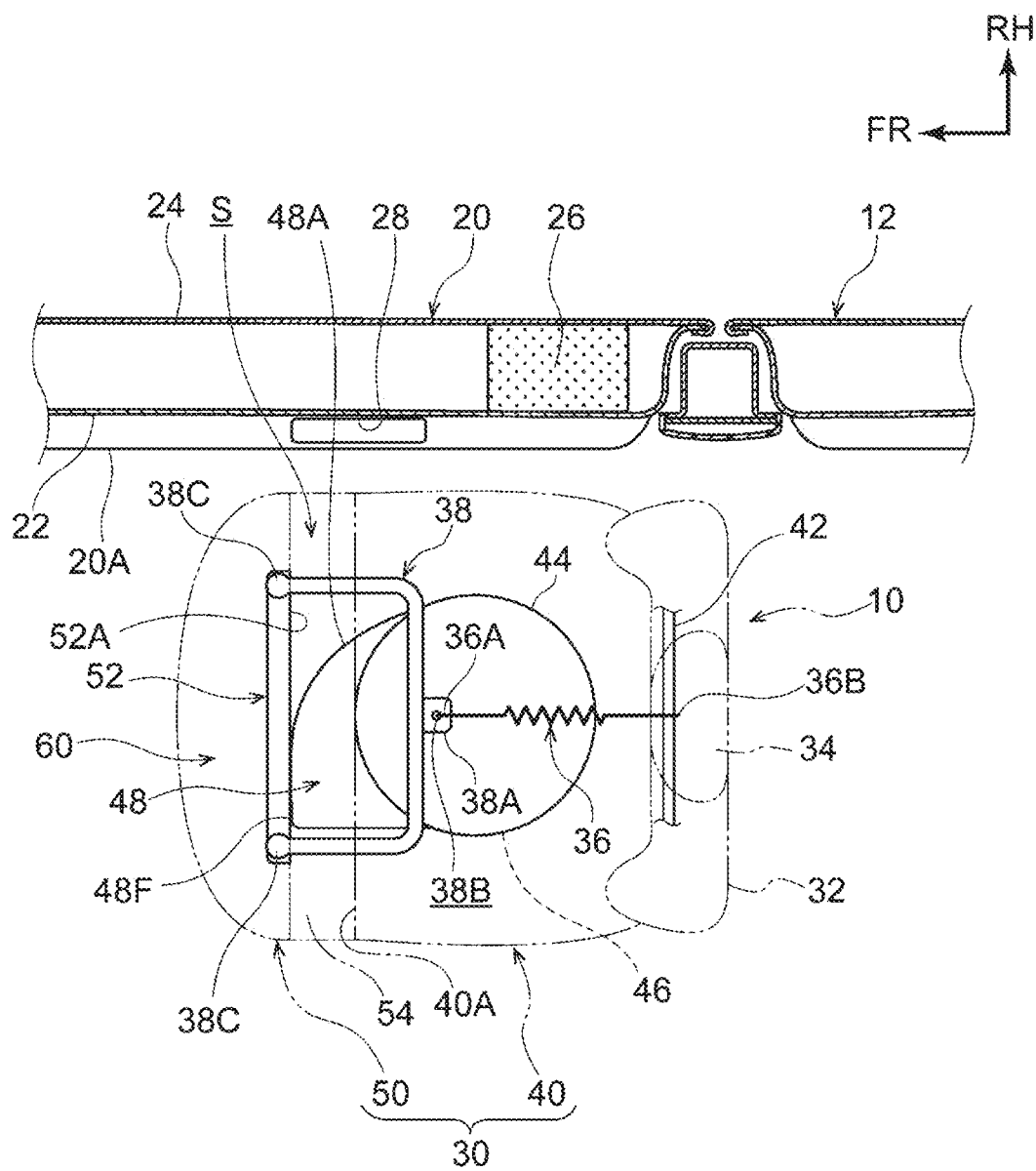
FIG. 1 is a plan view showing a vehicle seat according to an embodiment before the vehicle seat is rotated.

As shown in FIG. 1, a vehicle seat 10 according to the present embodiment is provided as a front seat (for example, a right seat) of a vehicle 12. That is, a front side door 20 is provided on the outside (right side) of the vehicle seat 10 in a vehicle width direction. The front side door 20 includes a door inner panel 22 and a door outer panel 24.

A pad 26 serving as a shock absorber that can absorb at least a part of the collision load at the time of a side collision is provided at a predetermined position between the door inner panel 22 and the door outer panel 24. A door pocket 28 is provided at a predetermined position on a door trim 20A of the front side door 20.

Figure 2:
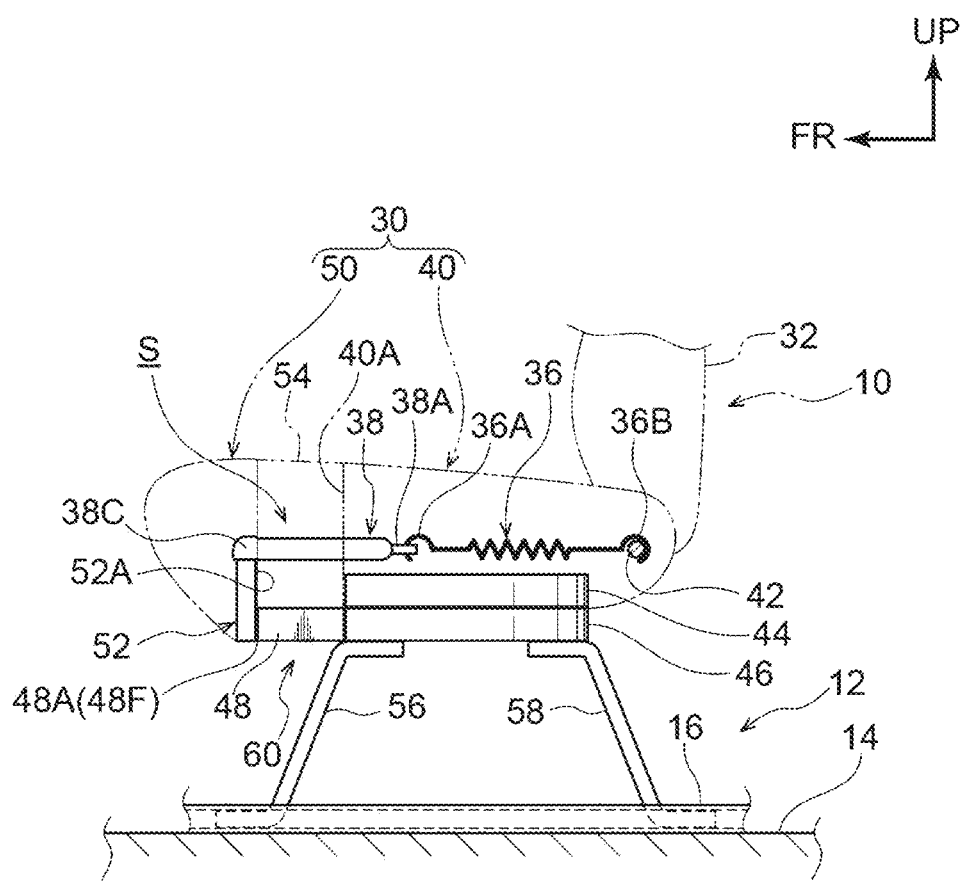
FIG. 2 is a side view showing the vehicle seat according to the present embodiment before the vehicle seat is rotated.

The vehicle seat 10 has a seat cushion 30 on which an occupant sits, a seat back 32 that supports the back of the occupant, and a headrest 34 that supports the head of the occupant. As shown in FIGS. 1 and 2, the seat cushion 30 has a seat cushion body 40 on the rear side (seat back 32 side) and a seat cushion front portion 50 on the front side thereof.

The seat cushion front portion 50 provided in front of the seat cushion body 40 is supported so as to be in contact with and distanced from the seat cushion body 40 by a cam mechanism 60 described later. More specifically, a support rod 38 having a circular section and bent in a substantially "U" shape in a plan view is provided in a substantially central portion of the seat cushion body 40 in the thickness (up and down) direction.

On the outer peripheral surface of the central portion of the support rod 38 in the longitudinal direction (width direction of the seat cushion 30), a bracket 38A having a substantially rectangular flat plate shape in a plan view is integrally provided so as to be projected toward the seat back 32. A circular through hole 38B is provided in the central portion of the bracket 38A.

One end 36A of a coil spring 36 serving as an urging member is attached to the bracket 38A. That is, the one end 36A of the coil spring 36 is formed in a hook shape, and the one end 36A formed in the hook shape is inserted into the through hole 38B of the bracket 38A from above.

The other end 36B of the coil spring 36 is also formed in a hook shape, and the other end 36B formed in the hook shape is attached to a central portion of a frame member 42 in the longitudinal direction that is provided in the seat cushion body 40. The frame member 42 is a rod having a circular section and extending in the width direction of the seat cushion 30 at the rear end of the seat cushion body 40, and the other end 36B of the coil spring 36 is hooked on the frame member 42 from above.

The support rod 38 and the coil spring 36 are preferably provided in the substantially central portion of the seat cushion 30 in the thickness direction or below the central portion thereof so as not to be affected by the weight of the occupant seated on the seat cushion 30 (so that the movement of the seat cushion body 40 in the front-rear direction is not hindered).

A substantially rectangular flat plate-shaped iron plate 52 serving as a receiving surface portion is embedded in the lower portion of the rear end of the seat cushion front portion 50. The longitudinal direction of the iron plate 52 is the width direction of the seat cushion 30 and the thickness direction of the iron plate 52 is the front-rear direction of the seat cushion 30. A rear surface 52A of the iron plate 52 is exposed to the outside from the seat cushion front portion 50. However, as long as a cam surface 48A of a cam portion 48 described later is relatively slidable, a part of (for example, the upper part of) the rear surface 52A does not have to be exposed to the outside.

Two tip portions 38C on the open side of the support rod 38 are integrally joined to both ends on the upper surface of the iron plate 52 in the longitudinal direction by joining means such as welding. Further, a rotating plate 44 having a circular shape in a plan view is embedded in the lower portion of the seat cushion body 40, and the lower surface of the rotating plate 44 is exposed to the outside. The rotating plate 44 is supported by a support plate 46 serving as a support member so as to be rotatable with respect to the support plate 46.

The support plate 46 is formed in a circular shape having the same diameter as the rotating plate 44 in a plan view, and is provided so as to be coaxial with the rotating plate 44 and to overlap the rotating plate 44 in the up-down direction. With the rotation of the rotating plate 44 with respect to the support plate 46, the vehicle seat 10 (seat cushion 30) can be set to a traveling position facing the front of the vehicle and an ingress and egress position facing the front side door 20.

The lower surface of the support plate 46 is supported by a pair of right and left front legs 56 and a pair of right and left rear legs 58 so as not to be rotatable with respect to the front legs 56 and the rear legs 58. The front legs 56 and the rear legs 58 are supported by a pair of right and left rails 16 attached to a floor 14 of the vehicle 12 so as to be slidable with respect to the right and left rails 16.

Further, the cam portion 48 is integrally provided in the front end portion of the support plate 46. In a plan view, the cam portion 48 is formed in a fan shape, that is, substantially a quarter-circle shape having the cam surface 48A extending toward the seat back 32 from the innermost front end portion 48F in the vehicle width direction toward the outside in the vehicle width direction so that the cam surface 48A is inclined in an arc shape (so that the amount of protrusion toward the front gradually decreases).

The rear surface 52A of the iron plate 52 is configured to always be in contact with the cam surface 48A of the cam portion 48 due to the urging force of the coil spring 36. The lower end surface of the iron plate 52 is preferably located at the same height as the lower surface of the cam portion 48 or below the lower surface of the cam portion 48 so that the rear surface 52A of the iron plate 52 contacts the entire thickness (height) of the cam surface 48A.

As described above, the rear surface 52A of the iron plate 52 provided in the seat cushion front portion 50 is pushed by the front end portion 48F of the cam portion 48 (the innermost portion of the cam surface 48A in the vehicle width direction) against the urging force of the coil spring 36, whereby the vehicle seat 10 is set to the traveling position (posture) in which the seat cushion front portion 50 is distanced from the seat cushion body 40.

Figure 3:
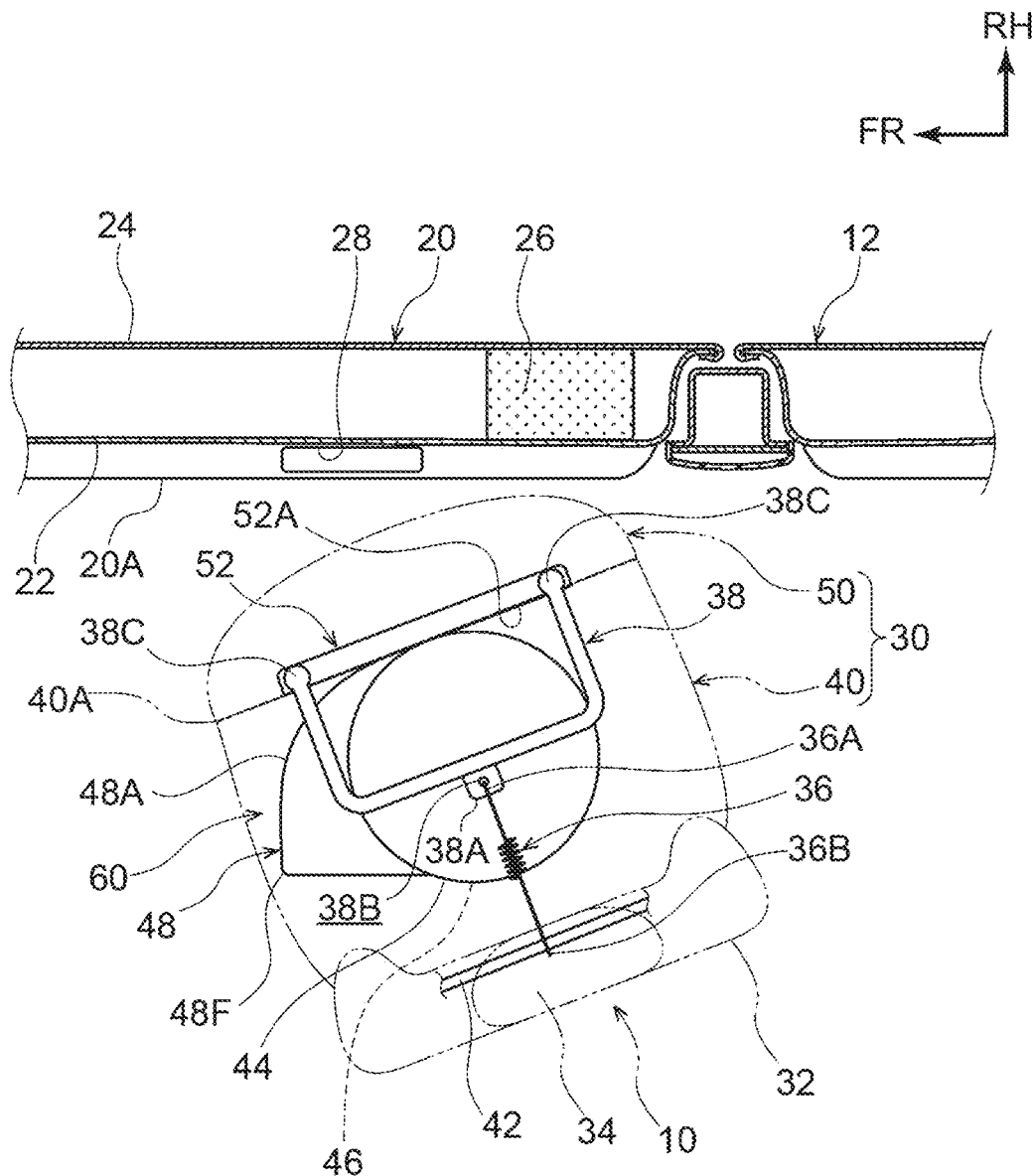
FIG. 3 is a plan view showing the vehicle seat according to the present embodiment after the vehicle seat is rotated.

As shown in FIG. 3, the vehicle seat 10 rotates toward the front side door 20 (the rotating plate 44 rotates clockwise with respect to the support plate 46), whereby the vehicle seat 10 is set to the ingress and egress position (posture) in which the rear surface 52A of the iron plate 52 provided in the seat cushion front portion 50 is in contact with the front surface 40A of the seat cushion body 40 by the urging force of the coil spring 36.

The vehicle seat 10 is configured such that, when the vehicle seat 10 is set to the ingress and egress position, the seat cushion 30 is located inside the front side door 20 in the vehicle width direction. The cam mechanism 60 serving as an expansion and contraction mechanism is composed of the cam portion 48, the iron plate 52, the support rod 38, and the coil spring 36. Further, the seat cushion 30 (the seat cushion body 40 and the seat cushion front portion 50) is covered with a seat cover 54. The seat cover 54 is made of cloth, for example.

Thus, as shown in FIGS. 1 and 2, in the traveling position where the seat cushion 30 is expanded (when the seat cushion front portion 50 is distanced from the seat cushion body 40), a gap S between the seat cushion body 40 and the seat cushion front portion 50 is hidden by the seat cover 54. That is, the gap S cannot be seen from the occupant due to the seat cover 54.

The shape and the like of the seat cushion 30 is devised so that the weight of the occupant is not supported by the gap S and the leg support performance during traveling is not impaired by the gap S. Further, in the ingress and egress position where the seat cushion 30 is contracted (when the seat cushion front portion 50 is in contact with the seat cushion body 40), the seat cover 54 is sagged downward so as to be housed in the gap S.

Next, the operation of the vehicle seat 10 having the above configuration will be described.

As shown in FIGS. 1 and 2, the seat cushion 30 is expanded when the vehicle seat 10 is in the traveling position. In other words, the seat cushion front portion 50 is pushed by the front end portion 48F of the cam portion 48 (the innermost portion of the cam surface 48A in the vehicle width direction) against the urging force of the coil spring 36 so as to be distanced to the front from the seat cushion body 40.

At this time, since the seat cover 54 is provided over the gap S between the seat cushion body 40 and the seat cushion front portion 50, the gap S is not seen from the occupant seated on the seat cushion 30. Further, the seat cushion 30 is configured such that the gap S does not support the weight of the occupant.

Thus, the legs (thighs) of the occupant are appropriately supported by the seat cushion 30 without the gap S. That is, it is possible to suppress the seating comfort (leg support performance) of the occupant seated on the seat cushion 30 from being hindered during traveling, and to reduce the occurrence of fatigue due to the hindering of the seating comfort.

On the other hand, when the occupant gets off the vehicle 12, the vehicle seat 10 (seat cushion 30) is rotated toward the front side door 20. That is, the rotating plate 44 is rotated clockwise with respect to the support plate 46. The rear surface 52A of the iron plate 52 provided in the seat cushion front portion 50 slides along the cam surface 48A of the cam portion 48 while maintaining contact with the cam surface 48A due to the urging force of the coil spring 36.

Here, in a plan view, the cam surface 48A is inclined in an arc shape and extends toward the seat back 32 from the innermost front end portion 48F in the vehicle width direction toward the outside in the vehicle width direction (toward the front side door 20). Therefore, the seat cushion front portion 50 (rear surface 52A) gradually approaches the seat cushion body 40 (front surface 40A) (the support rod 38 moves closer to the seat back 32) as the vehicle seat 10 rotates toward the front side door 20.

As a result, as shown in FIG. 3, the rear surface 52A of the iron plate 52 provided in the seat cushion front portion 50 comes into contact with the front surface 40A of the seat cushion body 40. In this state (a state that the length of the seat cushion 30 is reduced as compared to when the vehicle seat 10 is in the traveling position), the seat cushion 30 is contracted and the vehicle seat 10 is in the ingress and egress position.

When the vehicle seat 10 is in the ingress and egress position, the seat cushion 30 is located inside the front side door 20 in the vehicle width direction. Therefore, after the occupant opens the front side door 20 and gets off the vehicle, even when the vehicle seat 10 is not returned to the traveling position (even when the seat cushion 30 is in the ingress and egress position), the front side door 20 can be closed (see FIG. 3).

Further, even when the occupant gets on the vehicle 12 and opens the front side door 20, the vehicle seat 10 (seat cushion 30) is already in the ingress and egress position, so that the occupant can get on the vehicle quickly (it is not necessary to wait until the vehicle seat 10 in the traveling position rotates to the ingress and egress position).

In this way, when the occupant gets on the vehicle from the front side door 20, the vehicle seat 10 (seat cushion 30) is rotated inward in the vehicle width direction. That is, the rotating plate 44 is rotated counterclockwise with respect to the support plate 46. Then, along with the rotation, the rear surface 52A of the iron plate 52 provided in the seat cushion front portion 50 slides along the cam surface 48A of the cam portion 48 while being pushed forward by the cam surface 48A.

That is, the seat cushion front portion 50 (rear surface 52A) is gradually distanced from the seat cushion body 40 (front surface 40A) (the support rod 38 moves forward) against the urging force of the coil spring 36.

As a result, as shown in FIGS. 1 and 2, the rear surface 52A of the iron plate 52 provided in the seat cushion front portion 50 proceeds to a state in which the rear surface 52A is pushed by the front end portion 48F of the cam portion 48 (the innermost portion of the cam surface 48A in the vehicle width direction) (a state in which the seat cushion 30 is expanded). That is, the vehicle seat 10 is disposed in the traveling position. Thus, the legs (thighs) of the occupant are appropriately supported by the seat cushion 30 in the same manner as described above.

As described above, according to the present embodiment, it is possible to improve the convenience when getting on and off without impairing the leg support performance of the seat cushion 30 during traveling. Moreover, since the expansion and contraction mechanism is composed of the cam mechanism 60, the structure can be simplified and the manufacturing cost can be reduced as compared with the case where the expansion and contraction mechanism is composed of, for example, an electric mechanism.

Further, the cam mechanism 60 has the cam portion 48, the iron plate 52, the support rod 38, and the coil spring 36, and is configured such that the iron plate 52 urged by the coil spring 36 slides along the cam portion 48 (cam surface 48A) as the seat cushion 30 rotates. Therefore, the seat cushion front portion 50 can be accurately moved in the direction of contacting the seat cushion body 40 and in the direction away from the seat cushion body 40.

Further, since the urging member is composed of the coil spring 36, the cam mechanism 60 has superior reliability and can be manufactured at a lower cost as compared with the case where the urging member is composed of, for example, a leaf spring. Further, since the receiving surface portion is composed of the iron plate 52, the receiving surface portion has superior durability and can be manufactured at a lower cost as compared with the case where the receiving surface portion is composed of, for example, a resin flat plate member.

Further, the pad 26 that can absorb at least a part of the collision load at the time of a side collision is provided at a predetermined position between the door inner panel 22 and the door outer panel 24, and the door pocket 28 is provided at a predetermined position on the door trim 20A of the front side door 20. Therefore, even in the vehicle 12 provided with such a vehicle seat 10, the functionality and product appeal of the front side door 20 can be maintained.

The vehicle seat 10 according to the present embodiment has been described above with reference to the drawings, but the vehicle seat 10 according to the present embodiment is not limited to the illustrated embodiment and its design can be changed as appropriate within the scope of the present disclosure. For example, the iron plate 52 may be formed thicker than the iron plate 52 shown in the figures.

Further, the receiving surface portion is not limited to the mode composed of the iron plate 52, and may be composed of another metal plate. Further, the urging member is not limited to the mode composed of the coil spring 36, and the expansion and contraction mechanism is not limited to the mode composed of the cam mechanism 60. The expansion and contraction mechanism only needs to be configured such that the seat cushion front portion 50 can be brought into contact with and distanced from the seat cushion body 40 as the vehicle seat 10 (seat cushion 30) rotates.

Therefore, the expansion and contraction mechanism may be composed of an electric mechanism that is driven by electric power. For example, the expansion and contraction mechanism may be configured such that the seat cushion front portion 50 is brought into contact with and distanced from (moved with respect to) the seat cushion body 40 by supporting the seat cushion front portion 50 with the seat cushion body 40 using a guide rail, a ball screw, or the like (not shown), and rotating the ball screw in the forward and reverse directions using a motor (not shown).

What is claimed is:

1. A vehicle seat comprising:
    a seat cushion having a seat cushion body and a seat cushion front portion, the seat cushion front portion being provided in front of the seat cushion body and configured to be in contact with and distanced from the seat cushion body, and the seat cushion being configured to be rotated so as to be set to a traveling position facing a front of a vehicle and an ingress and egress position facing a side door; and
    an expansion and contraction mechanism configured such that the seat cushion front portion is brought into contact with the seat cushion body as the seat cushion rotates from the traveling position to the ingress and egress position, and the seat cushion front portion is distanced away from the seat cushion body as the seat cushion rotates from the ingress and egress position to the traveling position.

2. The vehicle seat according to claim 1, wherein the expansion and contraction mechanism is a cam mechanism.

3. The vehicle seat according to claim 1, wherein the expansion and contraction mechanism includes:
    a cam portion provided in a support member that is non-rotatable and supports the seat cushion such that the seat cushion is rotatable with respect to the support member;
    a receiving surface portion provided in the seat cushion front portion and with which the cam portion is brought into contact; and
    an urging member that urges the seat cushion front portion toward the seat cushion body.

4. The vehicle seat according to claim 3, wherein the expansion and contraction mechanism further includes a support rod joined to the receiving surface portion and to which the urging member is connected.

5. The vehicle seat according to claim 3, wherein the urging member is composed of a coil spring.

6. The vehicle seat according to claim 4, wherein the urging member is composed of a coil spring.

7. The vehicle seat according to claim 6, wherein a first end of the coil spring is attached to the support rod, and a second end of the coil spring is attached to the seat cushion body.

8. The vehicle seat according to claim 3, wherein the receiving surface portion is composed of an iron plate.

* * * * *